S. ROBINSON.
WINDSHIELD CLEANER.
APPLICATION FILED MAR. 5, 1921.
1,407,672.
Patented Feb. 21, 1922.
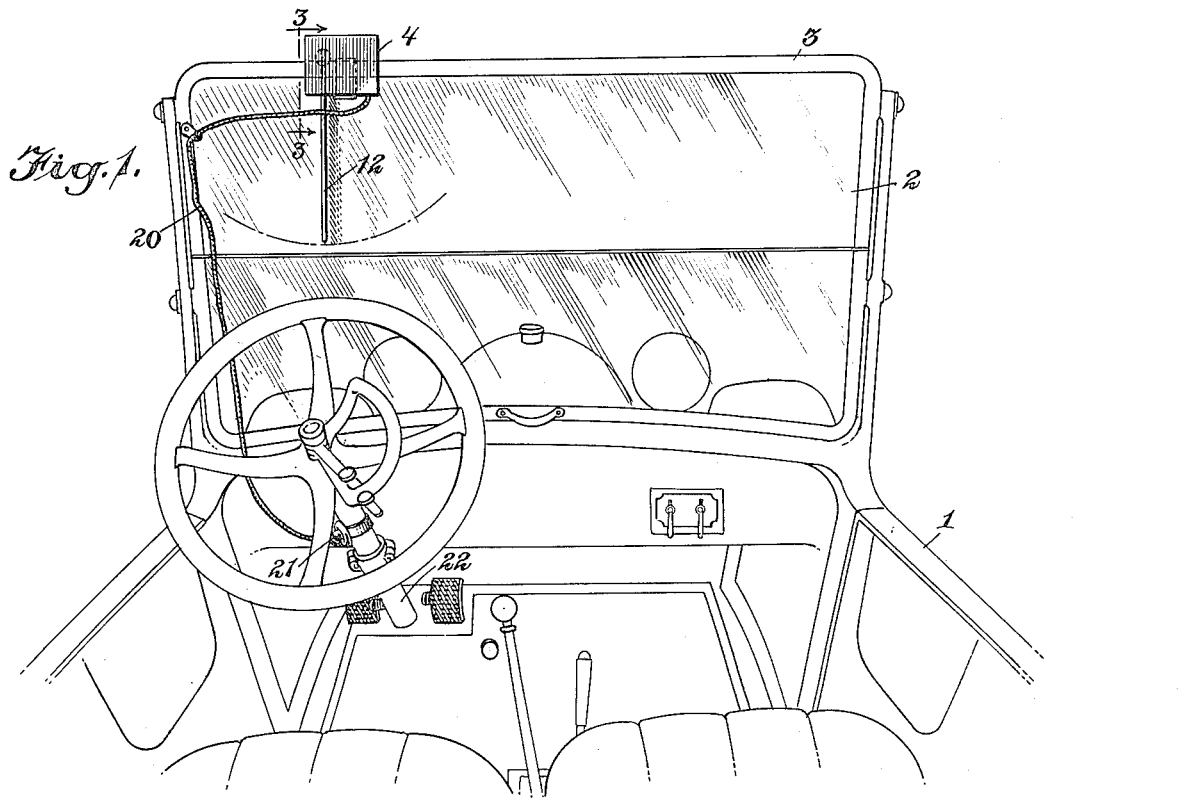
Fig. 1.
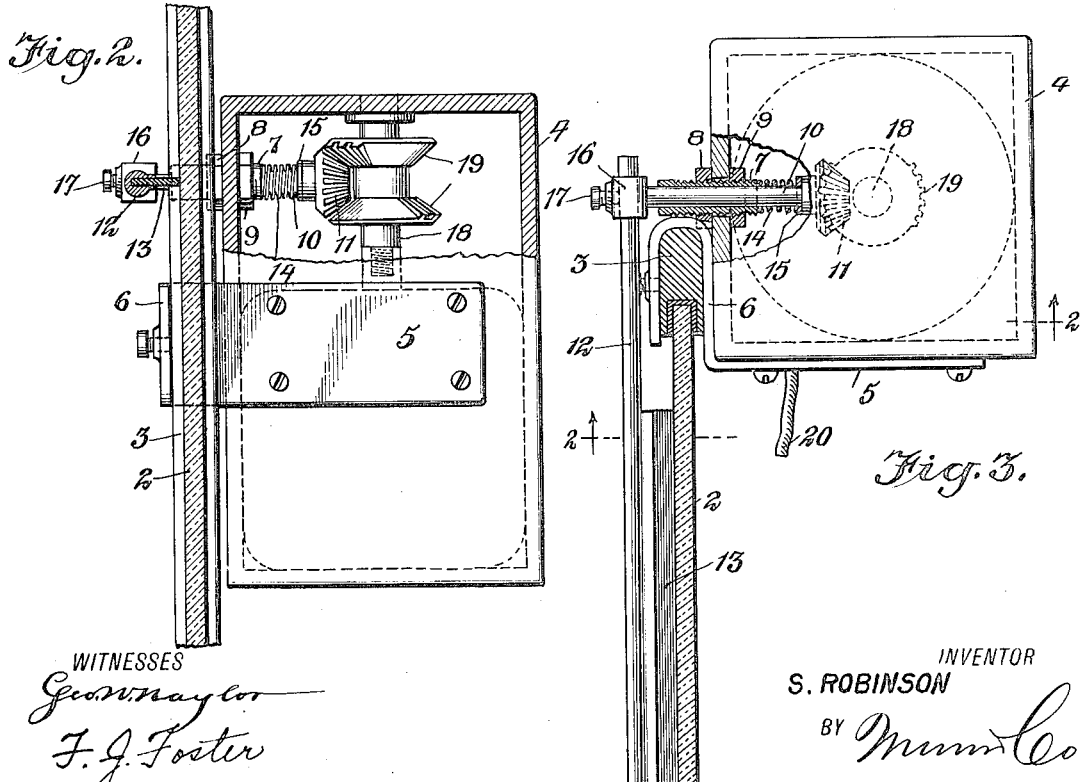
Fig. 2.
Fig. 3.
WITNESSES
Geo. W. Naylor
F. J. Foster
INVENTOR
S. ROBINSON
BY Munn & Co
ATTORNEYS

UNITED STATES PATENT OFFICE.

SAMUEL ROBINSON, OF WHITE PLAINS, NEW YORK.

WINDSHIELD CLEANER.

1,407,672.

Specification of Letters Patent. Patented Feb. 21, 1922.

Application filed March 5, 1921. Serial No. 449,654.

*To all whom it may concern:*

Be it known that I, SAMUEL ROBINSON, a citizen of the United States, and a resident of White Plains, in the county of Westchester and State of New York, have invented a new and Improved Windshield Cleaner, of which the following is a full, clear, and exact description.

This invention relates to improvements in wind shield cleaners, an object of the invention being to provide an electrically operated device for wiping the moisture off of the outside of a wind shield, so that the driver of a car may clearly see the road ahead when driving in inclement weather.

A further object is to provide a device of this character, which is slidably mounted on a wind shield and to provide improved means for oscillating the wiper.

A still further object is to provide a wind shield cleaner; which will be simple and practical in construction, durable and efficient in use, and comparatively inexpensive to manufacture.

With these and other objects in view, the invention consists in certain novel features of construction and combinations and arrangements of parts as will be more fully hereinafter described and pointed out in the claims.

In the accompanying drawings:—

Figure 1 is a perspective view illustrating my improved wind shield cleaner in applied position;

Figure 2 is a view in section on the staggered line 2—2 of Figure 1; and

Figure 3 is a view in section on the line 3—3 of Figure 1, with parts broken away for clearness.

Referring in detail to the drawings, 1 represents an automobile which is provided with a wind shield such as 2, mounted in a frame 3.

The actuating mechanism of my improved wind shield cleaner is enclosed in a rectangular box or casing 4. A bracket 5 secured at one end to the under face of the box 4 includes a hook-shaped portion 6, fitting over the upper frame bar of the wind shield and supporting the box on the inside of the wind shield so that it is protected from the weather.

An externally threaded bearing sleeve such as 7, extends through the outer wall of the box 4 and is locked in place by a pair of nuts 8 and 9. The sleeve provides mounting for a shaft 10. A bevelled pinion 11 is carried by the inner end of the shaft. A wiper carrying bar 12 is rigidly coupled at one end to the outer end of the shaft and carries any suitable form of wiper such as 13. The wiper 13 is maintained against the outer face of the wind shield by a coiled expansion spring 14 located around the shaft 10, between the inner end of the bearing sleeve 7 and a gasket or collar 15 on the shaft.

Any approved means of coupling the arm 12 to the shaft 10 may be employed. I have illustrated a block 16 fixed to the outer end of the shaft 10 and bored to receive the outer end of the rod 13, which is secured in place in the block by a set screw such as 17. A similar screw may be used to lock the bracket 5 against sliding movement on the upper frame bar of the shield.

It will be apparent that in order to wipe the moisture from the outside of the wind shield, it will be necessary to impart an intermittent rotary motion to the shaft 10. This motion of the shaft will oscillate the arm 12 and move the wiper 13 back and forth over the outer face of the wind shield.

I have illustrated one practical and simple means of imparting the desired motion to the shaft 10. This means comprises a shaft 18, journaled in the side wall of the box 4, and carrying a pair of mutilated bevelled gears 19 meshing intermittently with the bevelled pin 11 to impart an intermittent rotary motion in opposite directions to the shaft 10.

The shaft 18 may be connected by a wire such as 20 to any suitable motor (not shown) for driving the same. I have illustrated a circuit closing mechanism 21 in the form of a conventional push button construction secured in a convenient position to the steering collar 22 of the automobile and controlling the circuit which operates the shaft 18.

From the foregoing description it will be apparent that by merely pushing the button 21 to close the circuit, the shaft 18 will be rotated. The mutilated gear wheel 17 will mesh with the pinion 11 and rotate the shaft 10 intermittently in opposite directions. Since the rod 12 is rigidly coupled to the shaft 18, this movement of the shaft will swing the wiper 13 back and forth over the outer face of the wind shield effectively cleansing the same.

As illustrated in Figure 3 the spring 14 not only serves as a means for urging the wiper into engagement with the wind shield, but as a means for urging the pinion 11 into engagement with the mutilated gears 19. The tension of the spring 14 may be varied as the occasion requires by longitudinal adjustment to the sleeve 7 through the medium of the locking nuts 9.

Although I have illustrated one of the preferred embodiments of my invention, it will be apparent that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. A windshield wiper comprising a casing having means whereby the same may be secured to a windshield, a sleeve extended into the casing, a shaft rotatably extended through said sleeve and having one end provided with a power transmitting member, a wiper connected to the other end of said shaft, operating means arranged within the casing and associated with said power transmitting member, and a coiled spring confined between said sleeve and said power transmitting member for urging the power transmitting member into engagement with the operating means and for urging said wiper into contact with the windshield.

2. The construction set forth in claim 1, and nuts threaded on said sleeve and engaging opposite sides of said casing whereby to hold the sleeve in an adjusted position, said sleeve being adjustable longitudinally for varying the tension of said spring.

SAMUEL ROBINSON.